US010489708B2

(12) United States Patent
DeTone et al.

(10) Patent No.: US 10,489,708 B2
(45) Date of Patent: Nov. 26, 2019

(54) METHOD AND SYSTEM FOR PERFORMING CONVOLUTIONAL IMAGE TRANSFORMATION ESTIMATION

(71) Applicant: Magic Leap, Inc., Plantation, FL (US)

(72) Inventors: Daniel DeTone, San Francisco, CA (US); Tomasz Malisiewicz, Mountain View, CA (US); Andrew Rabinovich, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/600,545

(22) Filed: May 19, 2017

(65) Prior Publication Data
US 2017/0337470 A1    Nov. 23, 2017

Related U.S. Application Data

(60) Provisional application No. 62/339,799, filed on May 20, 2016.

(51) Int. Cl.
*G06K 9/00* (2006.01)
*G06N 3/08* (2006.01)
(Continued)

(52) U.S. Cl.
CPC ............... *G06N 3/08* (2013.01); *G06F 17/16* (2013.01); *G06K 9/46* (2013.01); *G06T 3/0068* (2013.01);
(Continued)

(58) Field of Classification Search
None
See application file for complete search history.

(56) References Cited

U.S. PATENT DOCUMENTS 9,064,161 B1   6/2015 Boman et al.
2005/0089213 A1* 4/2005 Geng ................. G06K 9/00214
                                                        382/154
(Continued)

FOREIGN PATENT DOCUMENTS

WO       2017201487 A1    11/2017

OTHER PUBLICATIONS

Invitation to Pay Additional Fees and, Where Applicable, Protest Fee and Partial Search Report for corresponding International Patent Application No. PCT/US2017/033661 mailed on Jul. 28, 2017, 2 pages.
(Continued)

*Primary Examiner* — Hadi Akhavannik
(74) *Attorney, Agent, or Firm* — Kilpatrick Townsend & Stockton LLP

(57) ABSTRACT

A method for generating inputs for a neural network based on an image includes receiving the image, identifying a position within the image, and identifying a subset of the image at the position. The subset of the image is defined by a first set of corners. The method also includes perturbing at least one of the first set of corners to form a second set of corners. The second set of corners defines a modified subset of the image. The method further includes determining a homography based on a comparison between the subset of the image and the modified subset of the image, generating a transformed image by applying the homography to the image, and identifying a subset of the transformed image at the position.

17 Claims, 14 Drawing Sheets
(10 of 14 Drawing Sheet(s) Filed in Color)

(51) Int. Cl.
*G06T 7/12* (2017.01)
*G06T 7/174* (2017.01)
*G06F 17/16* (2006.01)
*G06K 9/46* (2006.01)
*G06T 3/40* (2006.01)
*G06T 3/00* (2006.01)
*G06T 7/30* (2017.01)

(52) U.S. Cl.
CPC ............... *G06T 3/403* (2013.01); *G06T 7/12* (2017.01); *G06T 7/174* (2017.01); *G06T 7/30* (2017.01); *G06T 2207/20081* (2013.01); *G06T 2207/20084* (2013.01); *G06T 2207/20164* (2013.01)

(56) References Cited

U.S. PATENT DOCUMENTS

| | | | |
|---|---|---|---|
| 2012/0092329 A1 | 4/2012 | Koo et al. | |
| 2012/0243741 A1 | 9/2012 | Shet et al. | |
| 2014/0232743 A1* | 8/2014 | Na | G09G 5/377 345/629 |
| 2015/0310306 A1* | 10/2015 | Song | G06K 9/46 382/159 |
| 2017/0061246 A1* | 3/2017 | Chen | G06K 9/6232 |
| 2017/0337682 A1* | 11/2017 | Liao | G06T 7/30 |

OTHER PUBLICATIONS

Baker et al., "Equivalence and Efficiency of Image Alignment Algorithms", Proceedings of the 2001 IEEE Conference on Computer Vision and Pattern Recognition; Publication [online]. 2001 [retrieved Jul. 23, 2017]. Retrieved from the Internet: <URL: https://www.researchgate.net/profile/Iain_Matthews2/publication/2374956_Equivalence_and_Effeciency_of_Image_Alignment_Algorithms/links/0c96052ab405f7a5e000000.pdf>, pp. 1-8.
Notification of Transmittal of the International Search Report and the Written Opinion of the International Searching Authority, or the Declaration; International Search Report and Written Opinion of the International Searching Authority for corresponding International Patent Application No. PCT/US2017/033661 dated Sep. 28, 2017, 12 pages.
Alex, et al., "PoseNet: A Convolutional Network for Real-Time 6-OF Camera Relocalization", International Conference on Computer Vision (ICCV), Dec. 7, 2015, pp. 2938-2946.
Baker, et al., "Parameterizing Homographies", Tech. Report. CMU-RI-TR-06-11, Available online at: https://www.ri.cmu.edujpub filesjpub4/baker_simon_2006_1/baker_simon_2006_1, Mar. 2006, 22 pages.
Costante, et al., "Exploring Representation Learning With CNNs for Frame-to-Frame Ego-Motion Estimation", Robotics and Automation Letters, vol. 1, Issue 1, Jan. 2016, pp. 18-25.
Detone, et al., "Deep Image Homography Estimation", Arxiv.Org. Cornell University Library, Available online at https://arxiv.org/abs/1606.03798, Jun. 13, 2016, 6 pages.
EP17800299.4, "Extended European Search Report", dated Apr. 8, 2019, 12 pages.
Handa, et al., "gvnn: Neural Network Library for Geometric Computer Vision", Serious Games, vol. 9915, Jul. 25, 2016, pp. 67-82.
Jaderberg, et al., "Reading Text in the Wild with Convolutional Neural Networks", International Journal of Compute Vision, vol. 116, Issue 1, May 7, 2015, pp. 1-20.

\* cited by examiner

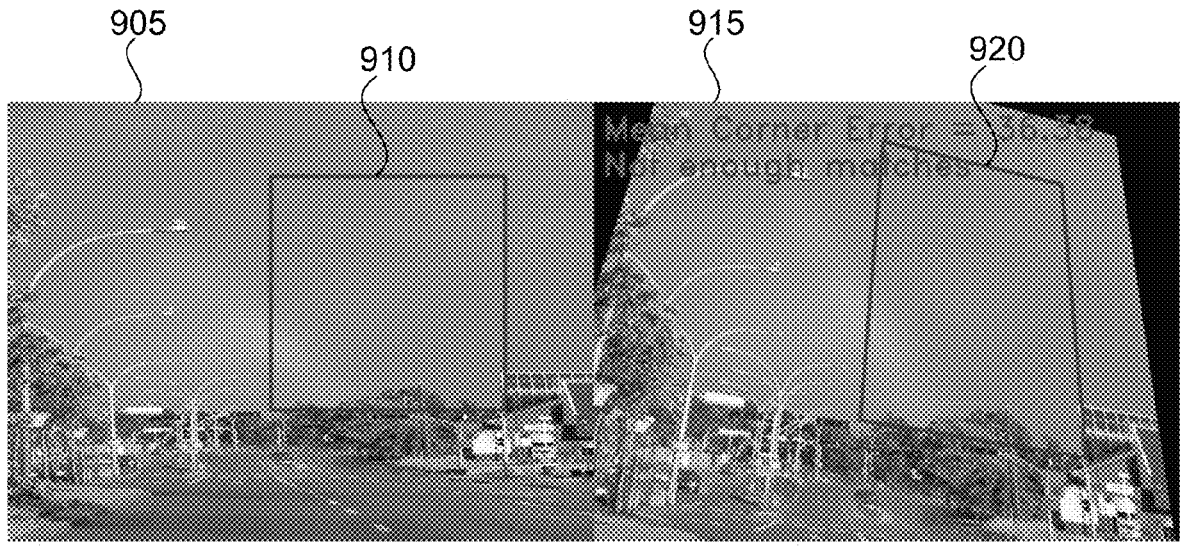
FIG. 9A    FIG. 9B
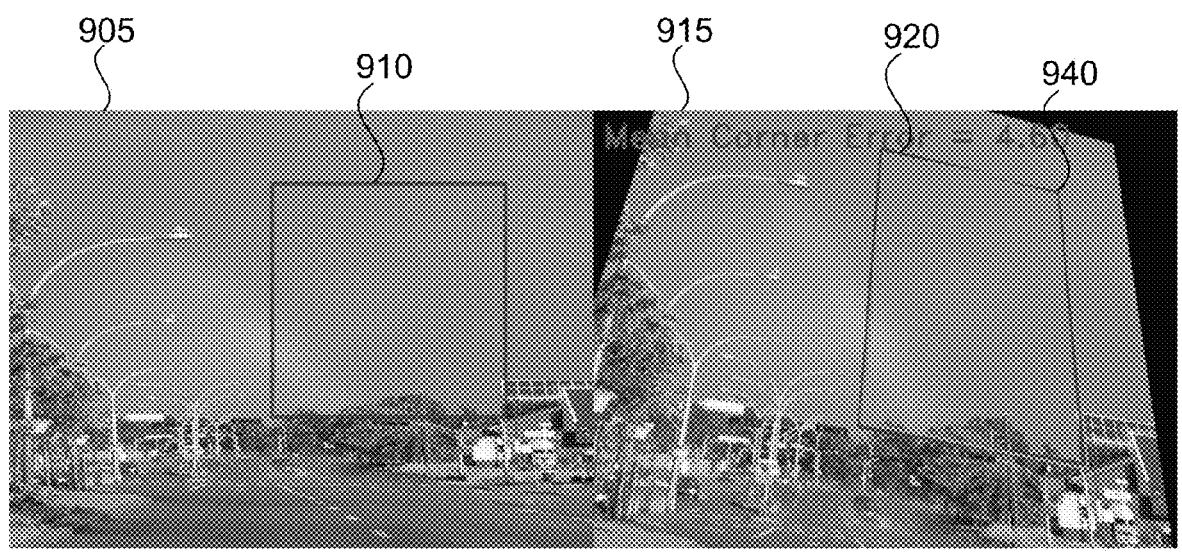
FIG. 9C    FIG. 9D

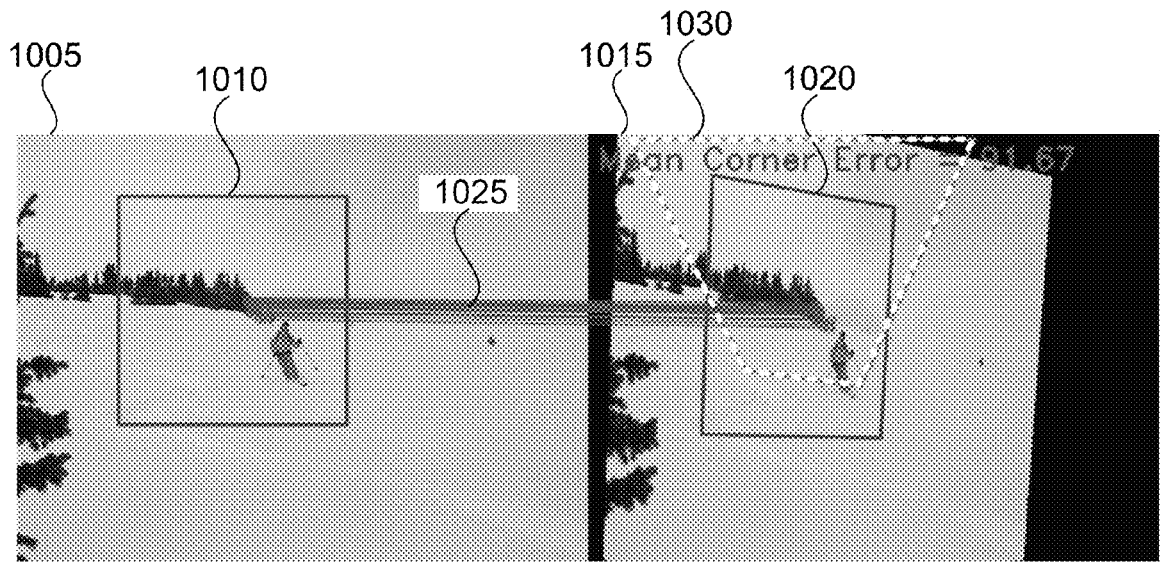
FIG. 10A   FIG. 10B
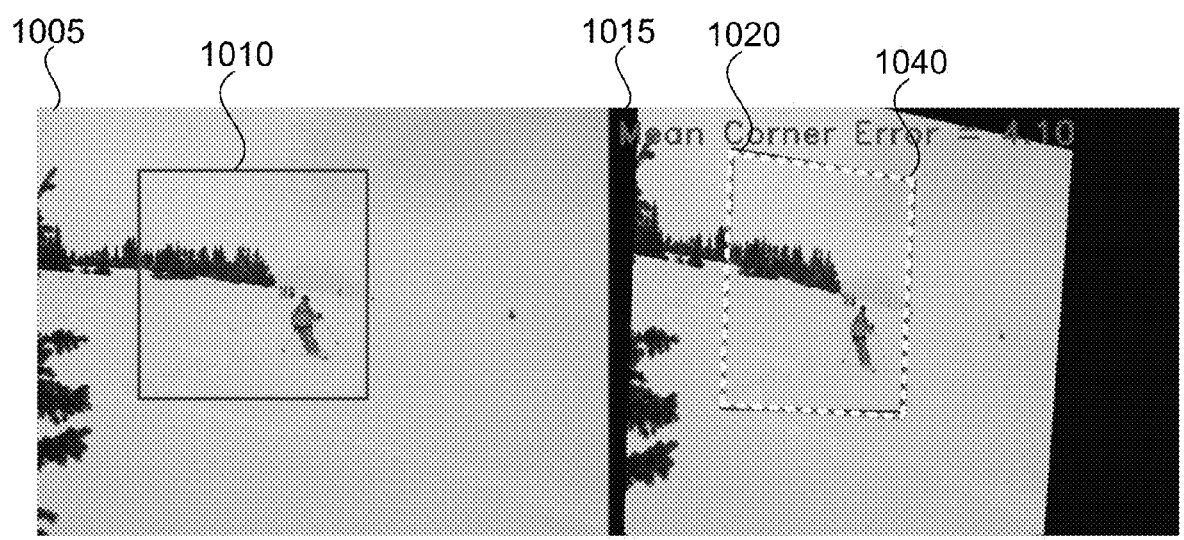
FIG. 10C   FIG. 10D

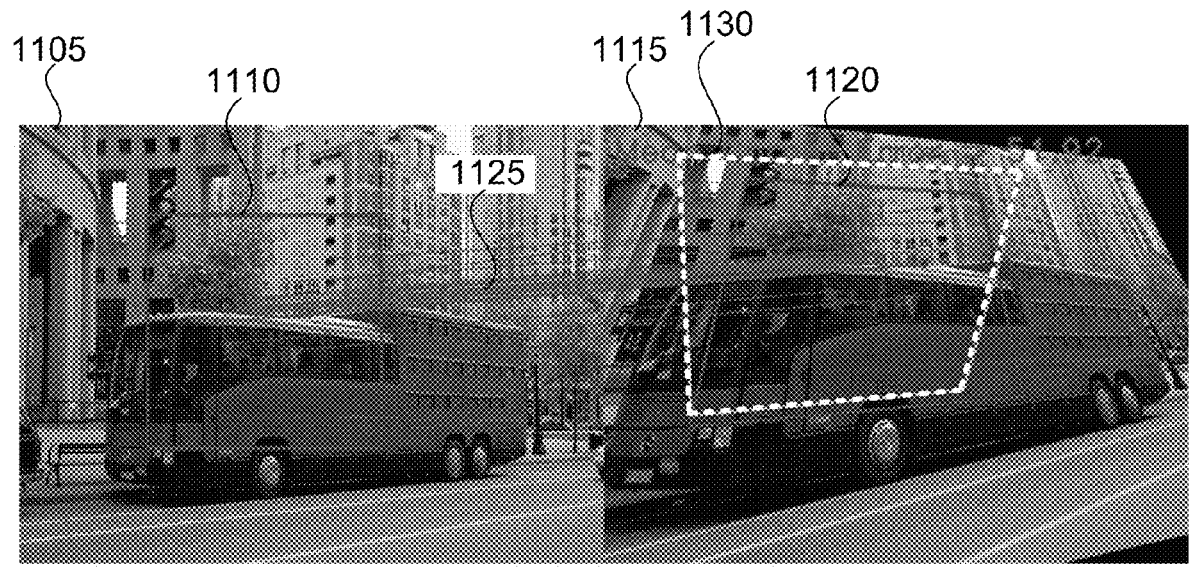
FIG. 11A　　　　　　FIG. 11B
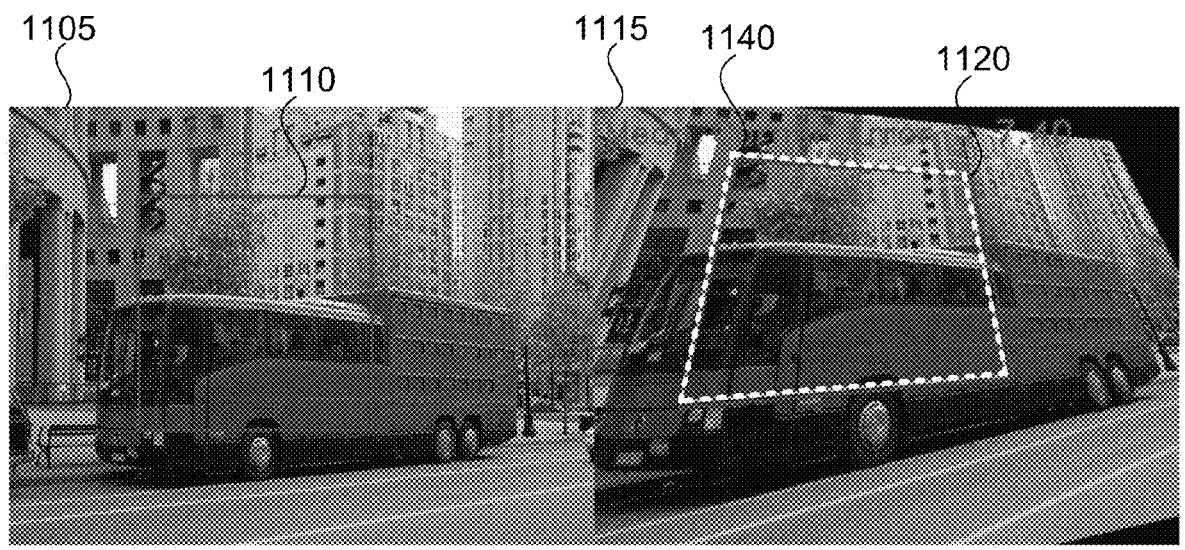
FIG. 11C　　　　　　FIG. 11D

METHOD AND SYSTEM FOR PERFORMING CONVOLUTIONAL IMAGE TRANSFORMATION ESTIMATION

CROSS-REFERENCES TO RELATED APPLICATIONS

This application claims priority to U.S. Provisional Patent Application No. 62/339,799, filed on May 20, 2016, entitled "Deep Image Homography Estimation", the disclosure of which is hereby incorporated by reference in its entirety for all purposes.

BACKGROUND OF THE INVENTION

Estimating a two-dimensional (2D) homography (or projective transformation) from a pair of images is a fundamental task in computer vision. The homography is an essential part of monocular simultaneous localization and mapping (SLAM) systems in scenarios that include rotation only movements, planar scenes, and/or scenes in which objects are very far from the viewer. It is well-known that the transformation relating two images undergoing a rotation about the camera center is a homography, and it is not surprising that homographies are essential for creating panoramas. To deal with planar and mostly-planar scenes, the popular SLAM algorithm ORB-SLAM uses a combination of homography estimation and fundamental matrix estimation. Additional applications of homographies include augmented reality and camera calibration.

A conventional approach to homography estimation includes two stages: corner estimation and robust homography estimation. Robustness is introduced into the corner detection stage by returning a large and over-complete set of points, while robustness into the homography estimation step shows up as heavy use of RANSAC or robustification of the squared loss function. Since corners are not as reliable as man-made linear structures, the research community has put considerable effort into adding line features and more complicated geometries into the feature detection step. There is a need in the art for a single robust algorithm that, given a pair of images, returns the homography relating the pair.

SUMMARY OF THE INVENTION

According to an embodiment of the present invention, a method for generating inputs for a neural network based on an image are provided. The method includes receiving the image, identifying a position within the image, and identifying a subset of the image at the position. The subset of the image is defined by a first set of corners. The method also includes perturbing at least one of the first set of corners to form a second set of corners. The second set of corners defines a modified subset of the image. The method further includes determining a homography based on a comparison between the subset of the image and the modified subset of the image. The method also includes generating a transformed image by applying the homography to the image and identifying a subset of the transformed image at the position.

According to another embodiment of the present invention, a method for training a neural network is provided. The method includes receiving a plurality of images. For each individual image of the plurality of images, the method includes generating a training triplet including a subset of the individual image, a subset of a transformed image, and a homography based on the subset of the individual image and the subset of the transformed image and generating, by the neural network, an estimated homography based on the subset of the individual image and the subset of the transformed image. The method also includes comparing the estimated homography to the homography and modifying the neural network based on the comparison.

According to a specific embodiment of the present invention, a method for generating an estimated homography based on two images is provided. The method includes receiving a first image based on a first camera pose and receiving a second image based on a second camera pose. The method also includes inputting the first image and the second image into a neural network and generating, by the neural network, an estimated homography based on the first image and the second image. The neural network has been previously trained by receiving a plurality of images. For each individual image of the plurality of images, the method includes identifying a position within the individual image and identifying a subset of the individual image at the position. The subset of the individual image is defined by a first set of corners. The method also includes perturbing at least one of the first set of corners to form a second set of corners, the second set of corners defining a modified subset of the individual image and determining a homography based on a comparison between the subset of the image and the modified subset of the image. The method further includes generating a transformed image by applying the homography to the individual image, identifying a subset of the transformed image at the position, generating a particular estimated homography based on the subset of the individual image and the subset of the transformed image, comparing the particular estimated homography to the homography, and modifying the neural network based on the comparison.

Numerous benefits are achieved by way of the present invention over conventional techniques. For example, embodiments of the present invention provide the ability to estimate a transformation between images when no corners are detected in one of the input images. Moreover, embodiments of the present invention provide the ability to estimate a transformation between images when detected corners are concentrated in a small subset of one of the input images. In other implementations, embodiments provide the ability to estimate a transformation between images when one of the images is blurry or taken in a low-light scenario. Additionally, the ability to estimate a transformation between images, using a single algorithm, for a wide range of image modalities (not limited-to, but including, grayscale images, color (RGB) images, depth (RGB-D) images, infrared images, and hyperspectral images), is provided by some embodiments. These and other embodiments of the invention along with many of its advantages and features are described in more detail in conjunction with the text below and attached figures.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which are included to provide a further understanding of the invention, are incorporated in and constitute a part of this specification, illustrate embodiments of the invention and together with the detailed description serve to explain the principles of the invention. No attempt is made to show structural details of the inven

FIGS. 9A-9D illustrate homography estimation results using a conventional technique and an embodiment of the present invention.

FIGS. 10A-10D illustrate homography estimation results using a conventional technique and an embodiment of the present invention.

FIGS. 11A-11D illustrate homography estimation results using a conventional technique and an embodiment of the present invention.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF SPECIFIC EMBODIMENTS

Embodiments of the present invention relate to a deep convolutional neural network for performing homography estimation on a pair of images. Embodiments include the use of a Visual Geometry Group style (VGG-style) network suitable for the homography estimation task. In an implementation, a 4-point parameterization is employed to improve estimation performance. Because deep networks utilize a significant amount of data to be trained from scratch, a quasi-infinite dataset of training triplets ($I_p^A$, $I_p^B$, $H^{AB}$) may be created from an existing dataset of real images like the MS-COCO dataset. As described herein, training triplets ($I_p^A$, $I_p^B$, $H^{AB}$) can be generated by applying random projective transformations to a large dataset of real images. Embodiments of the present invention also include an additional formulation of the homography estimation problem as classification, which produces a distribution over homographies and can be used to determine the confidence of an estimated homography.

Figure 1:
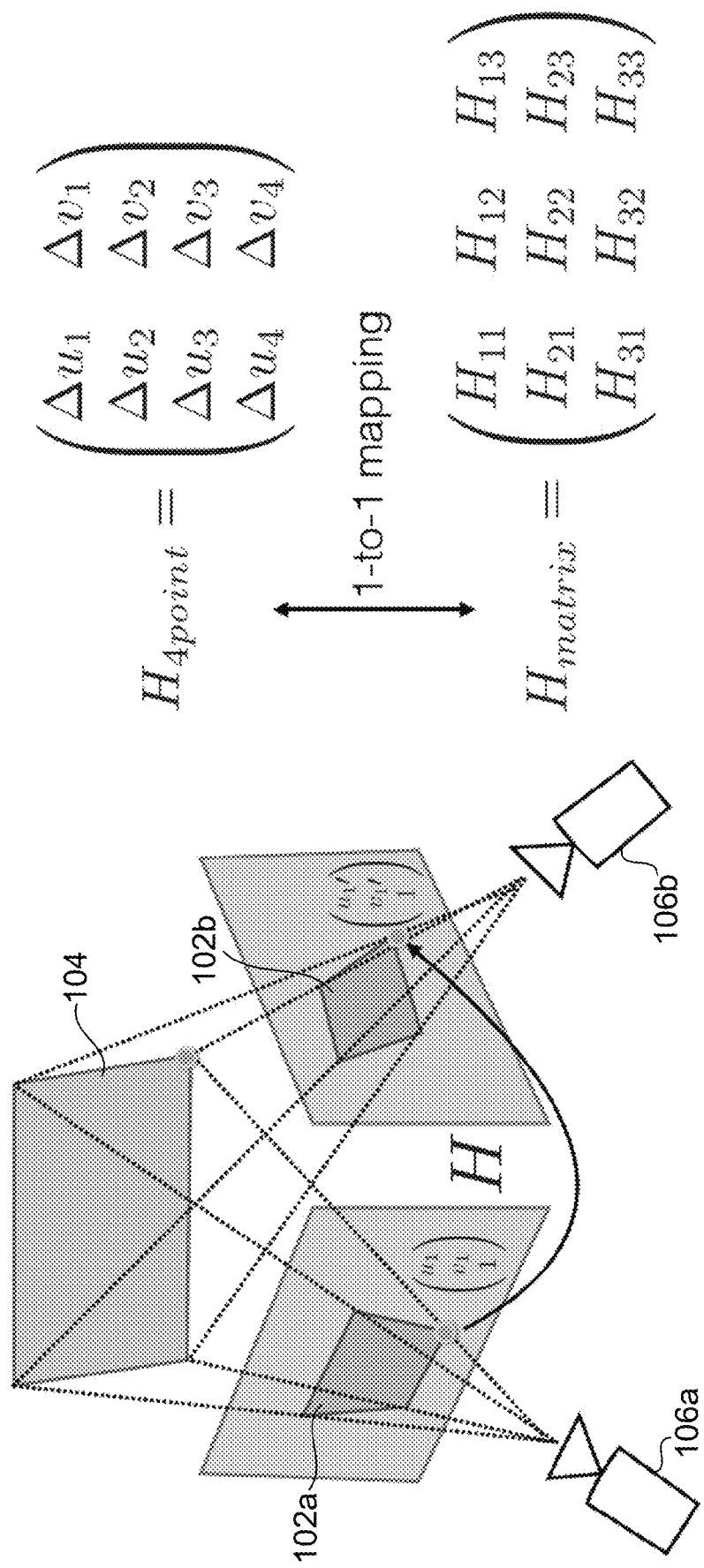
- FIG. 1 illustrates different parameterizations of a homography between two images, according to an embodiment of the present invention.

FIG. 1 illustrates different parameterizations of a homography between two images, according to an embodiment of the present invention. In some instances, a first image 102a of an object 104 captured from a first camera pose 106a and a second image 102b of object 104 captured from a second camera pose 106b may be relatable by a homography H. For example, in some embodiments, homography H may be applied to first image 102a to generate and/or recreate second image 102b, and an inverse homography $H^{-1}$ may be applied to second image 102b to generate and/or recreate first image 102a. In some embodiments, object 104 may be a planar surface such that second image 102b may be perfectly created using homography H. In some embodiments, object 104 may be non-planar but may be at a sufficient distance from first camera pose 106a and second camera pose 106b such that first image 102a and second image 102b may be approximately related by homography H.

The simplest way to parameterize homography H may be to use a 3×3 matrix and a fixed scale. The homography maps the pixels in the left image ([u, v]), to the pixels in the right image ([u', v']), and is defined up to scale by the following equation:

$$\begin{pmatrix} u' \\ v' \\ 1 \end{pmatrix} \sim \begin{pmatrix} H_{11} & H_{12} & H_{13} \\ H_{21} & H_{22} & H_{23} \\ H_{31} & H_{32} & H_{33} \end{pmatrix} \begin{pmatrix} u \\ v \\ 1 \end{pmatrix}. \quad \text{(Eqn. 1)}$$

The 3×3 matrix homography may include both rotational and translational terms. For example, the submatrix [$H_{11}$ $H_{12}$; $H_{21}$ $H_{22}$] represents the rotational terms in the homography, while the vector [$H_{13}$ $H_{23}$] is the translational offset. Balancing the rotational and translational terms as part of an optimization problem may be difficult. Therefore, in some embodiments, an alternate parameterization based on a single kind of location variable, namely the corner location, may be more suitable for deep homography estimation.

A 4-point parameterization may be implemented by letting $\Delta u_1 = u'_1 - u_1$ be the u-offset for the first corner, $\Delta u_2 = u'_2 - u_2$ be the u-offset for the second corner, $\Delta u_3 = u'_3 - u_3$ be the u-offset for the third corner, and $\Delta u_4 = u'_4 - u_4$ be the u-offset for the fourth corner. Thus, the 4-point parameterization represents a homography as follows:

$$H_{4point} = \begin{pmatrix} \Delta u_1 & \Delta v_1 \\ \Delta u_2 & \Delta v_2 \\ \Delta u_3 & \Delta v_3 \\ \Delta u_4 & \Delta v_4 \end{pmatrix} \quad \text{(Eqn. 2)}$$

where $\Delta v_i = v'_i - v_i$ is the v-offset for the i-th corner. Equivalent to the matrix formulation of the homography, the 4-point parameterization uses eight numbers. Once the displacement of the four corners is known, $H_{4point}$ can be converted to $H_{matrix}$. This can be accomplished using a variety of techniques, for example, using the normalized Direct Linear Transform (DLT) algorithm or the function getPerspectiveTransform( ) in OpenCV.

Figure 2:
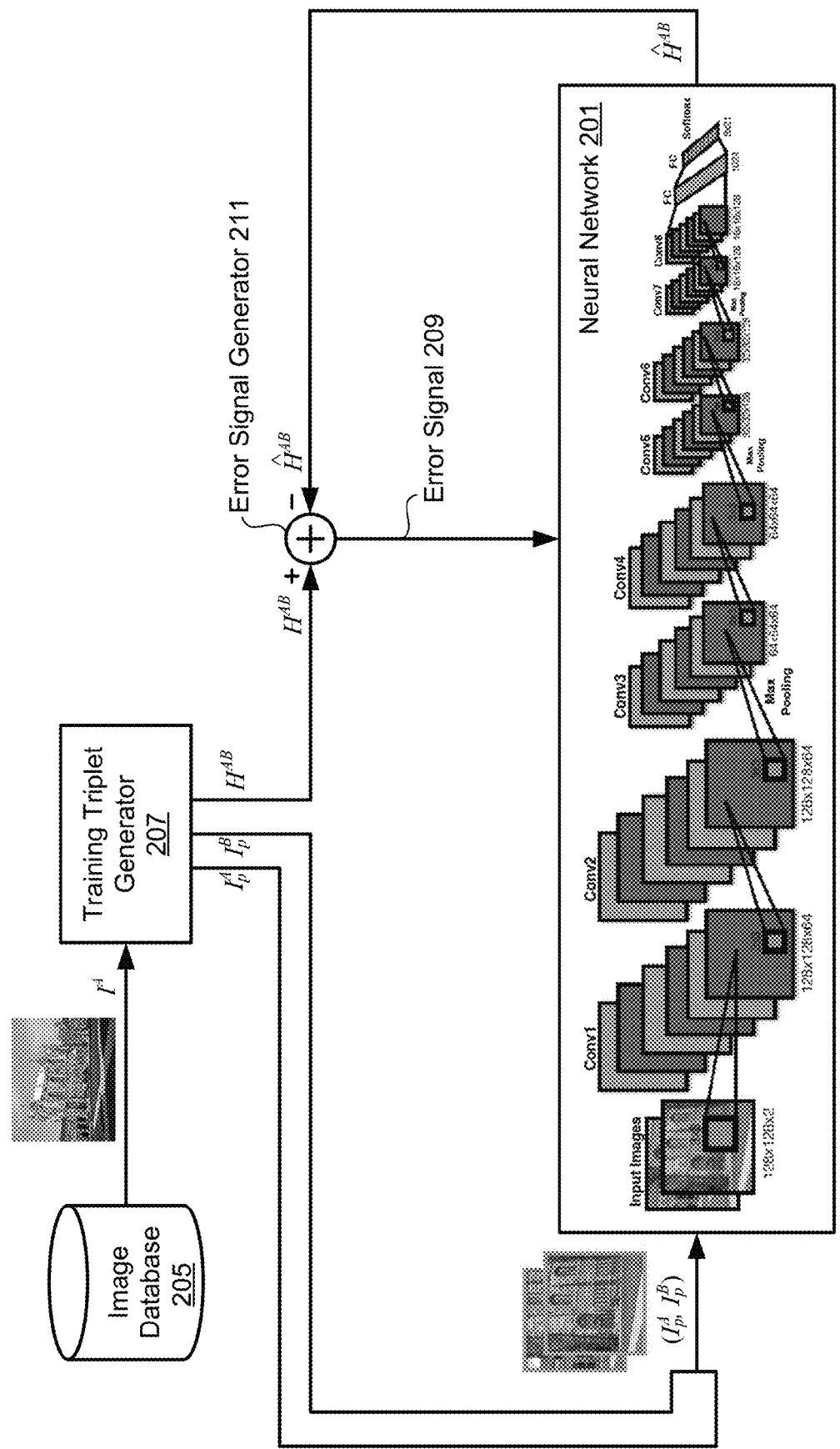
FIG. 2 illustrates a system for training a neural network, according to an embodiment of the present invention.

FIG. 2 illustrates a system 200 for training a neural network 201, according to an embodiment of the present invention. System 200 may include an image database 205, which can be used to provide a plurality of images to a training triplet generator 207. In some instances, training triplet generator 207 may receive an input image $I^A$ from image database 205 and may generate a subset $I_p^A$ of image $I^A$, a subset $I_p^B$ of a transformed image $I^B$, and a homography $H^{AB}$ relating image $I^A$ to transformed image $I^B$ (referred to herein as a training triplet). The various operations performed by training triplet generator 207 are described in additional detail with reference to FIGS. 4 and 5A-5F. In some implementations, homography $H^{AB}$ may be referred to as the ground truth homography since it exactly maps subset $I_p^A$ to subset $I_p^B$.

In some applications of the present invention, neural network 201 utilizes 3×3 convolutional blocks with Batch-Norm and ReLUs, which may be similar to the Oxford VGG Net. Neural network 201 may take as input a two-channel grayscale image sized 128×128×2. For example, the two input images, which are related by homography $H^{AB}$, can be stacked channel-wise and fed into neural network 201. In some instances, 8 convolutional layers are used with a max pooling layer (2×2, stride 2) after every two convolutions. The 8 convolutional layers may have the following number of filters per layer: 64, 64, 64, 64, 128, 128, 128, 128. The convolutional layers may be followed by two fully connected layers. The first fully connected layer may have 1024 units. Dropout with a probability of 0.5 may be applied after the final convolutional layer and the first fully-connected layer.

In some embodiments, two different networks may be implemented in neural network 201, i.e., a regression network and/or a classification network. The networks may share the same architecture up to the last layer, where one network produces real-valued outputs and the other network produces discrete quantities. The regression network may directly produce 8 real-valued numbers and uses the Euclidean (L2) loss as the final layer during training. The classification network may use a quantization scheme, may have a softmax at the last layer, and may use the cross entropy loss function during training. While quantization may indicate that there is some inherent quantization error, the classification network may be able to produce a confidence for each of the corners produced using the classification network. In some instances, 21 quantization bins are used for each of the 8 output dimensions, which results in a final layer with 168 output neurons.

In some instances, neural network 201 is trained using an iterative algorithm or an iterative optimization algorithm, which can be referred to as a stochastic gradient descent algorithm. These iterative optimization algorithms start with a random setting for the neural network's weights and iteratively move the weights in a direction using the "Gradient," which is the derivative the neural network's error signal with respect to the network weights. In some implementations, the gradient computation is performed using the chain rule of calculus. The gradient can be determined using one training triplet, in which case the batch size is a batch size of one. Alternatively, the gradient can be determined using a set of training triplets, e.g., 64 triplets. In this implementation, the training is performed with a mini-batch of 64.

As illustrated in FIG. 2, subsets $I_p^A$ and $I_p^B$ are inputted into neural network 201, an estimated homography $\hat{H}^{AB}$ is generated by neural network 201 based on subsets $I_p^A$ and $I_p^B$, a comparison is made between estimated homography $\hat{H}^{AB}$ and homography $H^{AB}$ by error signal generator 211, an error signal 209 is generated by error signal generator 211, and neural network 201 is modified based on error signal 209. In some instances, the modifications made to neural network 201 based on error signal 209 are such that error signal 209 is driven toward zero (e.g., decreased) after subsequent runs by neural network 201 using the same input images. For example, where error signal 209 is equal to $H^{AB}-\hat{H}^{AB}$, neural network 201 may be modified (or self-modify) such that estimated homography $\hat{H}^{AB}$ is driven closer to homography $H^{AB}$ after subsequent runs. This may be accomplished by modifying the convolutional layers within neural network 201.

Figure 3:
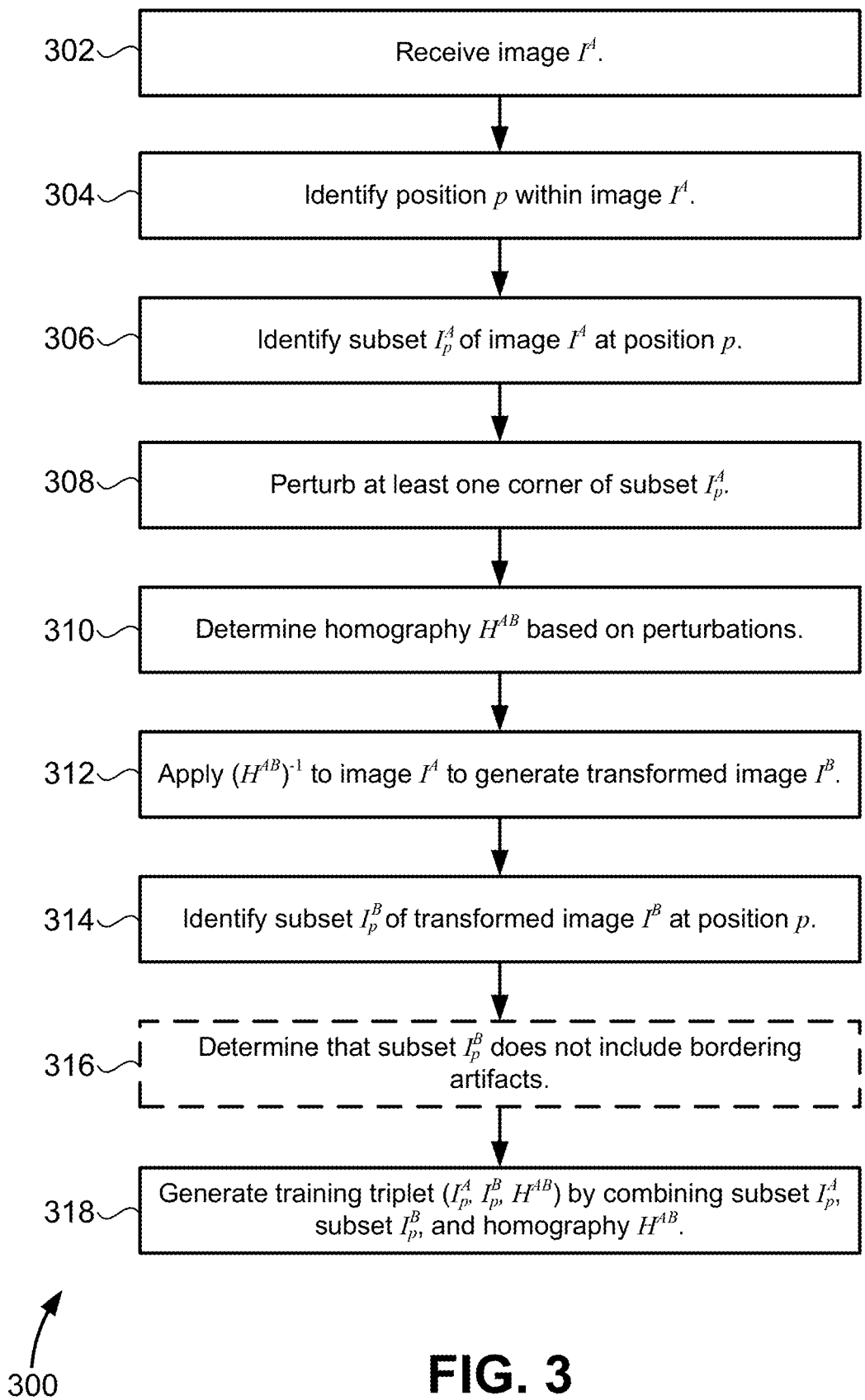
FIG. 3 illustrates a method for generating inputs for a neural network based on an image, according to an embodiment of the present invention.

FIG. 3 illustrates a method 300 for generating inputs for a neural network (such as neural network 201) based on an image (such as image $I^A$), according to an embodiment of the present invention. Operations of method 300 may be performed in any order, and not all operations need be performed during performance of method 300. Various operations of method 300 are shown in connection with FIGS. 5A-5F.

Figure 5A:
FIGS. 5A-5F illustrate various operations for generating inputs for a neural network.

At block 302, an image $I^A$ is received (e.g., image 510 illustrated in FIG. 5A). Image $I^A$ may be a two-dimensional (2D) image that is vector or pixel (e.g., raster) based. For example, each pixel of image $I^A$ may be represented using a gray scale value (comprising 1 numerical value per pixel) or an RGB color model (comprising 3 numerical values per pixel). In some embodiments, image $I^A$ can be a depth map and each pixel of image $I^A$ can be a depth value. Image $I^A$ may be square, rectangular, or of some other shape. Receiving image $I^A$ may include receiving, retrieving, and/or obtaining image $I^A$ from some source either internal or external to system 200. For example, as illustrated in FIG. 2 training triplet generator 207 may retrieve image $I^A$ from image database 205 subsequent to (e.g., immediately after) generating a training triplet using a previous image.

At block 304, a position p is identified within image $I^A$. Position p may include a single location (e.g., pixel location) within image $I^A$ or may include multiple locations (e.g., multiple pixel locations) within image $I^A$, such as the locations of four corners of a subset of image $I^A$ or all the pixels within a subset of image $I^A$. In some embodiments, position p corresponds to a center pixel location of the subsequently identified subset of image $I^A$, the center pixel location being the intersection of the average vertical pixel location of image $I^A$ and the average horizontal pixel location of image $I^A$. In some embodiments and as described more fully below, identifying position p may include randomly selecting a pixel location within image $I^A$ such that the subsequently identified subset of image $I^A$ does not extend outside image $I^A$. In some embodiments, identifying position p may include randomly selecting a pixel location within image $I^A$ such that the subsequently identified perturbation regions do not extend outside image $I^A$.

At block 306, a subset $I_p^A$ of image $I^A$ is identified at position p. In some embodiments, subset $I_p^A$ may be similar to or different than subset 520 shown in reference to FIG. 5A. For example, subset $I_p^A$ may be a square defined by a first corner 525a, a second corner 525b, a third corner 525c, and a fourth corner 525d. Although subset $I_p^A$ is depicted as a square in FIG. 5A, in other embodiments subset $I_p^A$ may be a rectangle, triangle, circle, oval, or some other polygon. Accordingly, embodiments of the present invention are not limited to square images. Furthermore, subset $I_p^A$ need not be a single continuous grouping of pixels, but may be the combination of multiple unconnected groupings of pixels. Optionally, subset $I_p^A$ (and similarly position p) may be identified based on the desired type of training images, such as training images that exclusively include features such as landscapes, cityscapes, people, animals, walls, ceilings, floors, etc.

At block 308, at least one of the corners defining subset $I_p^A$ is perturbed, forming one or more perturbed corners. In some embodiments, perturbing at least one of the corners defining subset $I_p^A$ may be similar to or different than that shown in reference to FIGS. 5B and 5C. For example, referring to FIG. 5B, four perturbation regions 535 may be formed surrounding each of corners 525 of subset 520. Specifically, a first perturbation region 535a is formed surrounding first corner 525a, a second perturbation region 535b is formed surrounding second corner 525b, a third perturbation region 535c is formed surrounding third corner 525c, and a fourth perturbation region 535d is formed surrounding fourth corner 525d. Each of the perturbation regions represent possible locations of perturbed corners 540 and may be associated with some probabilistic distribution for the new corner locations. For example, in some embodiments, a uniform distribution is employed such that any pixel location within a certain perturbation region is as likely as any other pixel location within the certain perturbation region to be the new corner location. In other embodiments, a normal distribution is employed such that pixel locations closer to corners 525 are more likely to be selected as the new corner locations.

In some embodiments, displacement vectors 530 are generated for each of corners 525 for relating corners 525 to perturbed corners 540. Specifically, a first displacement vector 530a may be generated based on sampling a probabilistic distribution defined by first perturbation region 535a, and may be combined (e.g., added) with first corner 525a to form first perturbed corner 540a. Similarly, a second displacement vector 530b may be generated based on sampling a probabilistic distribution defined by second perturbation region 535b, and may be combined (e.g., added) with second corner 525b to form second perturbed corner 540b. Similar operations may be performed with respect to third displacement vector 530c and fourth displacement vector 530d.

In some instances, each of perturbation regions 535 have a width and a height of $2\rho$. In other words, each of corners 525 defining subset $I_p^A$ may be perturbed by a value within the range $[-\rho, \rho]$ in both the vertical and horizontal directions. In some implementations of the present disclosure, position p and perturbation range $\rho$ may be selected such that perturbation regions 535 do not extend outside image $I^A$. For example, where position p corresponds to a center pixel location of subset $I_p^A$, and subset $I_p^A$ has a length and a height of 1, perturbation regions 535 do not extend outside image $I^A$ when position p is selected such that it is at least a distance of $\rho+1/2$ away from all edges of image $I^A$. In some instances, position p is randomly selected to be a pixel location within image $I^A$ using a uniform probabilistic distribution defined by the region at least a distance of $\rho+1/2$ away from all edges of image $I^A$.

Figure 5B:
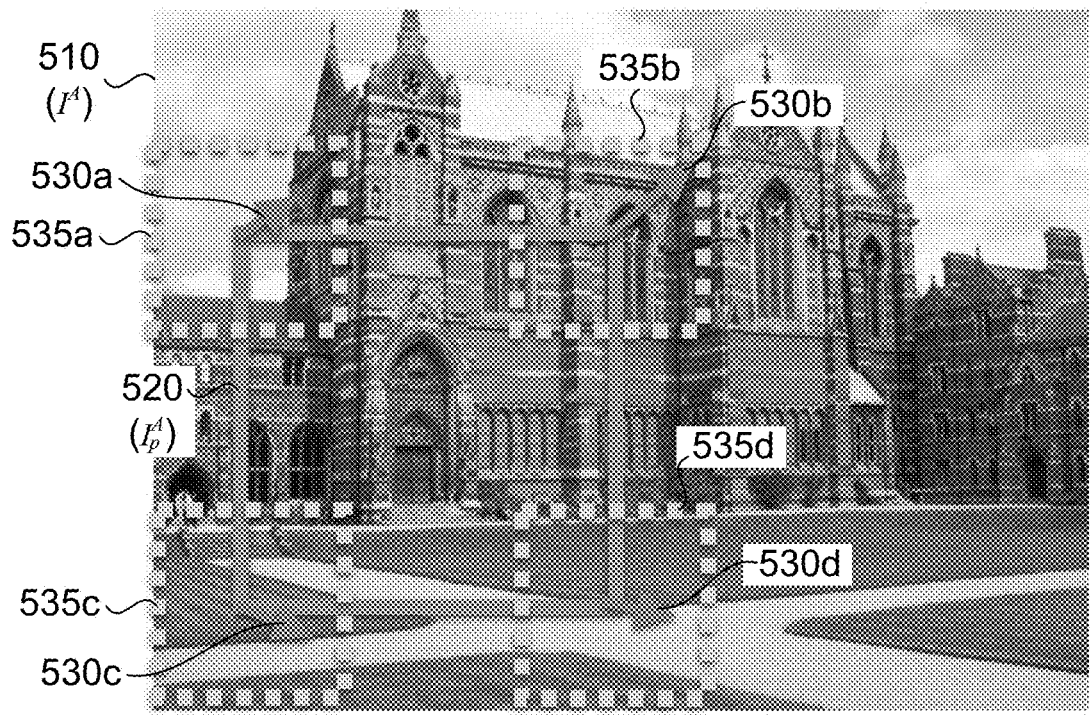
Figure 5C:
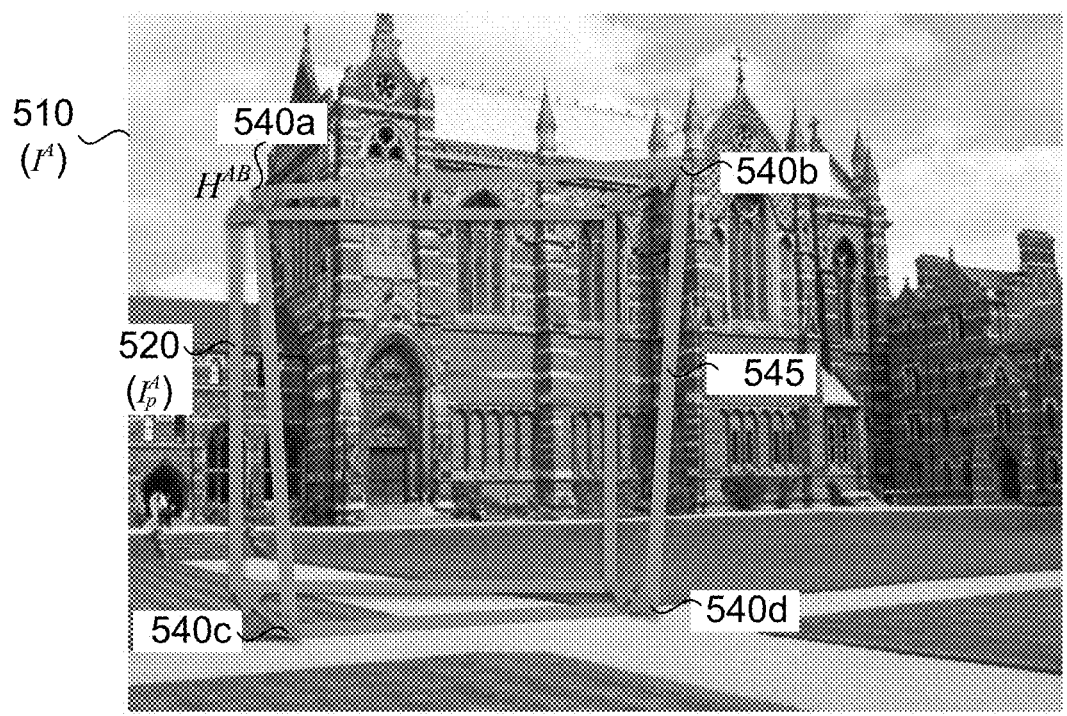
Figure 5D:
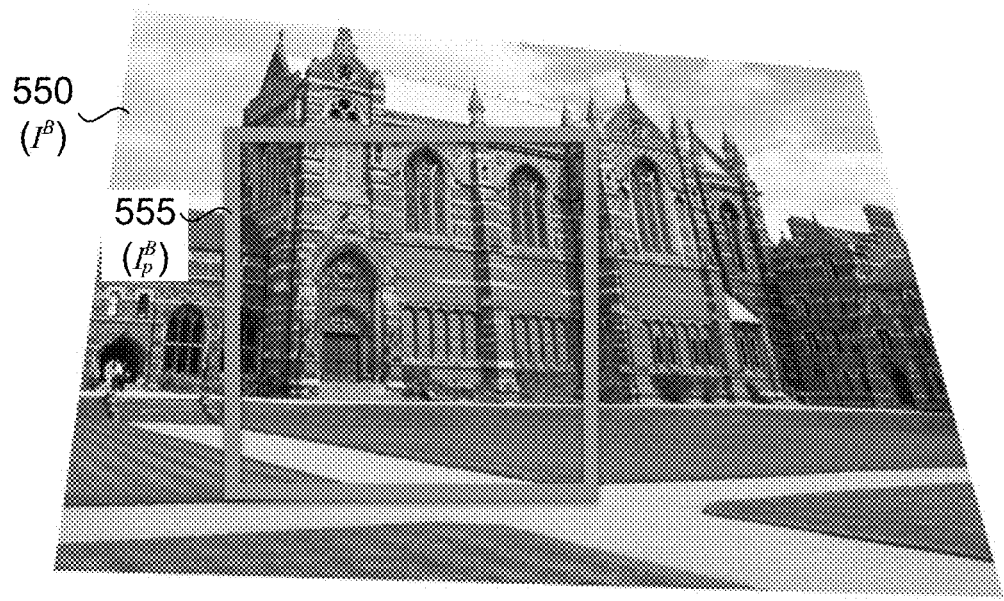
Figure 5E:
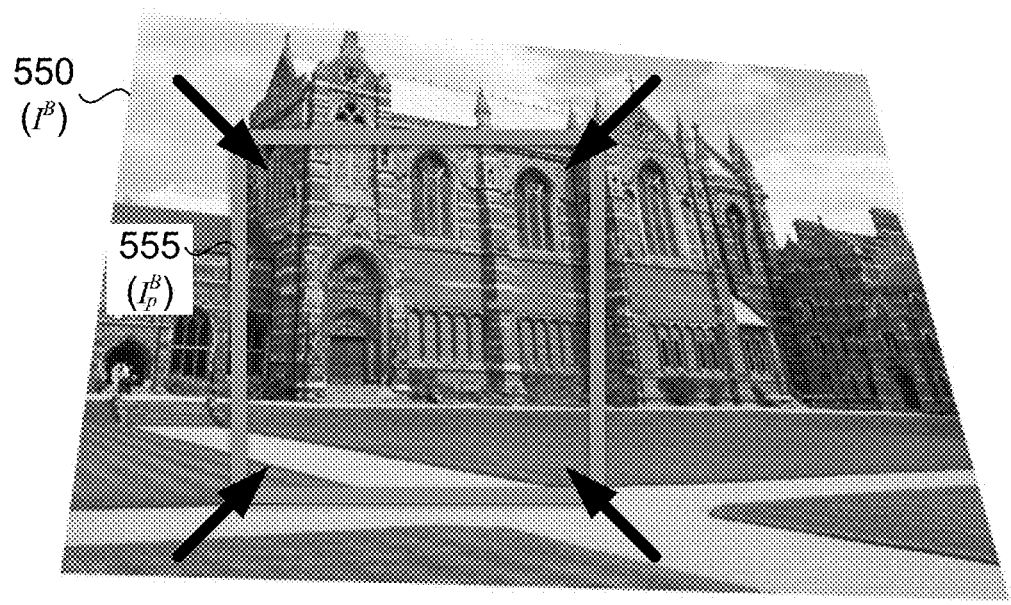

Perturbed corners 540 define a modified subset 545 of image $I^A$. When at least one corner of corners 525 is perturbed, modified subset 545 is different than subset $I_p^A$ such that modified subset 545 includes at least one pixel more, at least one pixel less, or at least one pixel different than subset $I_p^A$. Modified subset 545 may itself be a subset of subset $I_p^A$ or subset $I_p^A$, may itself be a subset of modified subset 545. Although FIGS. 5B and 5C show all four corners of subset 520 being perturbed, in some embodiments one, two, or three corners may be perturbed. In some instances, displacement vectors 530 are identical such that modified subset 545 may be identical in size as subset $I_p^A$ but shifted in a predetermined direction.

At block 310, a homography $H^{AB}$ is determined based on a comparison between subset $I_p^A$ and modified subset 545. In some instances, determining homography $H^{AB}$ based on a comparison between subset $I_p^A$ and modified subset 545 may include a comparison between corners 525 and perturbed corners 540. For example, using the $H_{4point}$ equation (Eqn. 2), the u-offsets and v-offsets may be set equal to displacement vectors 530, i.e., the vectors between corners 525 and perturbed corners 540. After being determined, homography $H^{AB}$ may be converted from one parameterization to another. For example, after being determined, homography $H^{AB}$ may be converted from $H_{4point}$ to $H_{matrix}$, or vice versa.

At block 312, a transformed image $I^B$ is generated by applying homography $H^{AB}$ to image $I^A$. Because various ways are contemplated for determining a homography, applying homography $H^{AB}$ to image $I^A$ may include either applying homography $H^{AB}$ directly or applying an inverse of homography $H^{AB}$ (e.g. $(H^{AB})^{-1}$) to image $I^A$. In some embodiments, transformed image $I^B$ may be similar to or different than transformed image 550 shown in reference to FIG. 5D. Applying homography $H^{AB}$ to image $I^A$ may include performing one or more of various operations between homography $H^{AB}$ and image $I^A$, including but not limited to, multiplication, division, addition, subtraction, convolution, and the like. In some embodiments, image $I^B$ is generated by multiplying the inverse of homography $H^{AB}$ with image $I^A$ such that $I^B = I^A \times (H^{AB})^{-1}$.

As described herein, a homography transformation $H^{AB}$ is defined between 2-dimensional points expressed as 3-dimensional quantities in homogeneous coordinates (see Eqn. 1). Thus, the equation $x'_i = H^{AB} x_i$ is mathematically precise. However, when applying a homography to an image of height H, width W, and dimension D, a similar, shorthand equation can be utilized: $I' \sim H^{AB} \times I$. For this equation, the transformation of a D-dimensional image via a homography is performed by taking the integer-valued pixel locations from I', referenced as (u',v'), applying the inverse transformation to obtain real-valued coordinates in the original image (u,v) and then using bilinear interpolation to interpolate the D-dimensional pixel value from the original image. In other words, when applying homographies to points, mathematical precision is utilized, but when applying homographies to images, an interpolation method is utilized to infer the value of each pixel's D-dimensional value. Because interpolation is implemented in a similar manner for images of an arbitrary number of dimensions D, the same equation can be utilized for grayscale images, color images, RGB-D images, as well as images of an arbitrarily large dimension D, namely, $I' \sim H^{AB} \times I$. It should be appreciated that the discussion of applying homography to images herein will be understood by one of skill in the art in terms of applying homography to points and interpolating pixel values. Accordingly equations having equality for image homography should be understood in this light as an approximation based on interpolation.

At block 314, a subset $I_p^B$ of image $I^B$ is identified at position p. In some embodiments, subset $I_p^B$ may be similar to or different than subset 555 shown in reference to FIG. 5D. For example, subset $I_p^B$ may be a square having identical pixel locations, but not identical pixel values, as subset $I_p^A$. For example, subset $I_p^B$ may be identical in size (e.g., width and height) as subset $I_p^A$. Although subset $I_p^B$ is depicted as a square in FIG. 5D, in other embodiments subset $I_p^B$ may be a rectangle, triangle, circle, oval, or some other polygon. Furthermore, subset $I_p^B$ need not be a single continuous grouping of pixels, but may be the combination of multiple unconnected groupings of pixels.

At block 316, it is determined whether subset $I_p^B$ includes bordering artifacts (e.g. unknown pixels). For example, due to perturbation regions 535 including pixel locations outside image $I^A$ subset $I_p^B$ may include pixel locations that extend outside image $I^B$. Because such bordering artifacts may lead to erroneous training of neural network 201, it may be advantageous to restart method 300 (e.g., at block 304 or block 308) when a subset $I_p^B$ with bordering artifacts is detected. As shown in reference to FIG. 5E, where subset $I_p^B$ includes various corners, only the corners need to be checked for bordering artifacts for a determination to be made. When it is determined that subset $I_p^B$ does not include bordering artifacts, method 300 may proceed to block 318.

Figure 5F:
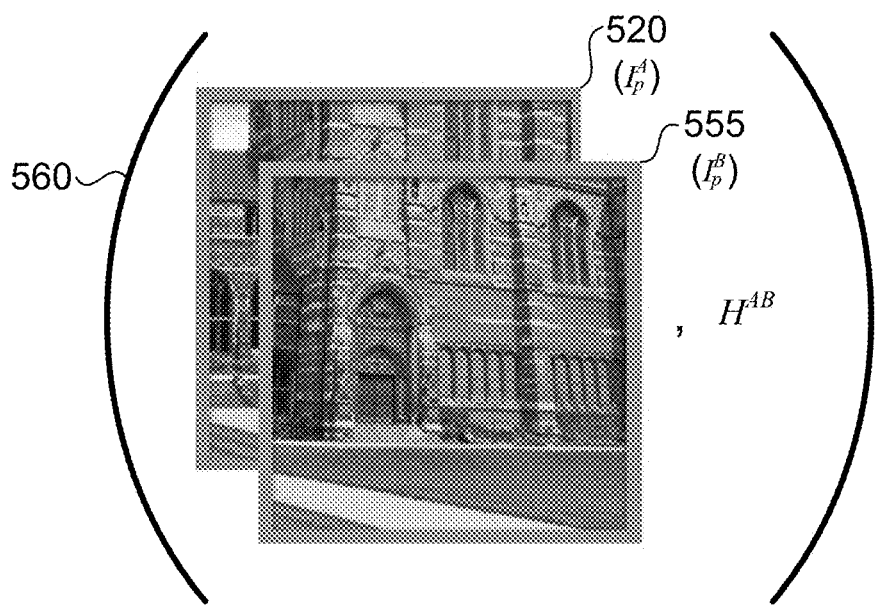

At block 318, a training triplet $(I_p^A, I_p^B, H^{AB})$ is generated by combining subset $I_p^A$, subset $I_p^B$, and homography $H^{AB}$ (as shown in FIG. 5F). Block 318 may be performed by outputting, sending, routing, and/or providing training triplet $(I_p^A, I_p^B, H^{AB})$ to neural network 201 and/or error signal generator 211.

It should be appreciated that the specific steps illustrated in FIG. 3 provide a particular method of generating inputs for a neural network based on an image according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
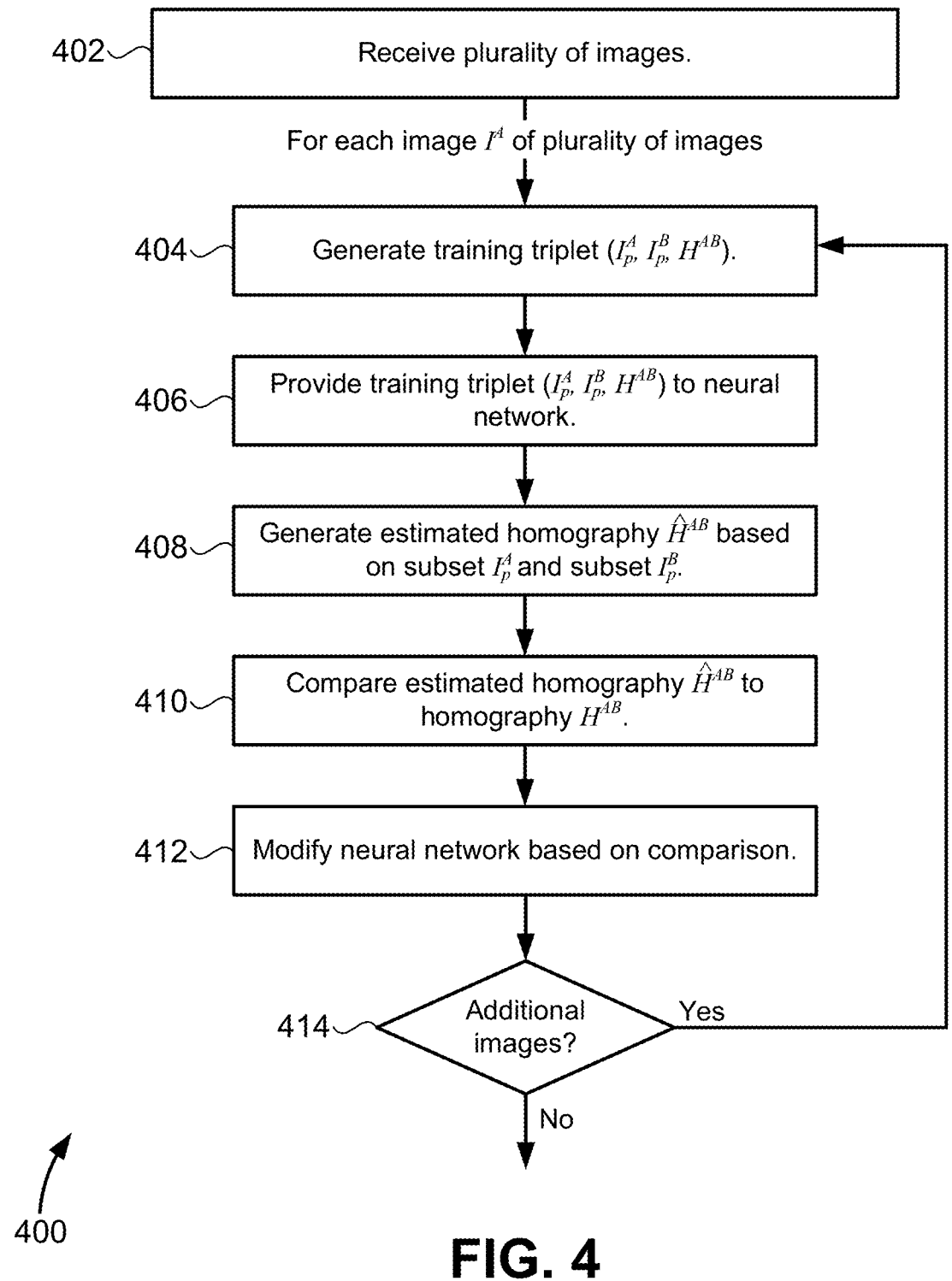
FIG. 4 illustrates a method for training a neural network, according to an embodiment of the present invention.

FIG. 4 illustrates a method 400 for training a neural network 201, according to an embodiment of the present invention. Operations of method 400 may be performed in any order, and not all operations need be performed during performance of method 400. Various operations of method 400 are shown in connection with FIGS. 2 and 5A-5F. At block 402, a plurality of images are received. For each of the plurality of images, blocks 404 through 412 may be performed.

At block 404, a training triplet $(I_p^A, I_p^B, H^{AB})$ may be generated by, for example, performing one or more operations as described in relation to the method of generating inputs for a neural network based on an image illustrated in reference to FIG. 3. At block 406, training triplet $(I_p^A, I_p^B, H^{AB})$ is provided to neural network 201 by, for example, outputting and/or sending training triplet $(I_p^A, I_p^B, H^{AB})$ to neural network 201 or one or more components coupled to neural network 201 (e.g., error signal generator 211).

At block 408, an estimated homography $\hat{H}^{AB}$ is generated, by neural network 201, based on subsets $I_p^A$ and $I_p^B$. At block 410, estimated homography $\hat{H}^{AB}$ is compared to homography $H^{AB}$. The comparison may include performing one or more mathematical operations based on estimated homography $\hat{H}^{AB}$ and homography $H^{AB}$. Block 410 may be performed by neural network 201, error signal generator 211, or by some other component coupled to neural network 201. In some embodiments, block 410 includes calculating, by error signal generator 211, an error signal 209 equal to $H^{AB} - \hat{H}^{AB}$. At block 412, neural network 201 is modified based on the comparison made in block 410. For example, neural network 201 may be modified (or self-modify) such that estimated homography $\hat{H}^{AB}$ is driven closer to homography $H^{AB}$ after subsequent runs. Furthermore, the extent of the modification made to neural network 201 may be proportional to error signal 209.

At block 414, it is determined whether there are additional images. If there are additional images, then method 400 returns to block 404 and a training triplet $(I_p^A, I_p^B, H^{AB})$ may be generated for the next image $I^A$. If there are no additional images, then method 400 ends. In some embodiments, when it is determined that there are no additional images, method 400 may return to block 404 and different training triplets $(I_p^A, I_p^B, H^{AB})$ may be generated for previously used images. For example, training triplets $(I_p^A, I_p^B, H^{AB})$ may be generated using different perturbation regions, or may be generated using similar perturbation regions that are randomly sampled differently than during previous iterations of method 400.

In some embodiments, the types of training images used to train neural network 201 may be selected such that an application-specific homography estimation engine may be built. For example, a robot that navigates an indoor factory floor using planar SLAM via homography estimation could be trained solely with images captured from the robot's image sensor of the indoor factory.

It should be appreciated that the specific steps illustrated in FIG. 4 provide a particular method of training a neural network according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

In one implementation of the present invention, neural network 201 is trained for about 8 hours on a single Titan X GPU using stochastic gradient descent (SGD) with momentum of 0.9. A base learning rate of 0.005 may be used, and the learning rate may be decreased by a factor of 10 after every 30,000 iterations. Neural network 201 may be trained for 90,000 total iterations using a batch size of 64. In some implementations, a popular open-source deep learning package, such as Caffe, may be utilized. To create the training data, the MS-COCO Training Set may be utilized. All images may be resized to 320×240 and converted to grayscale. In some embodiments, 500,000 pairs of image patches sized 128×128 related by a homography may be generated. The ρ value of each perturbation region may be set to 32, which means that each corner of the 128×128 grayscale image can be perturbed by a maximum of one quarter of the total image edge size. As discussed above, larger perturbation regions may be avoided to avoid extreme image transformations. In some instances, the weights of neural network 201 are initialized to random values and trained from scratch (i.e., no pre training). The MS-COCO validation set may be used to monitor overfitting.

Figure 6:
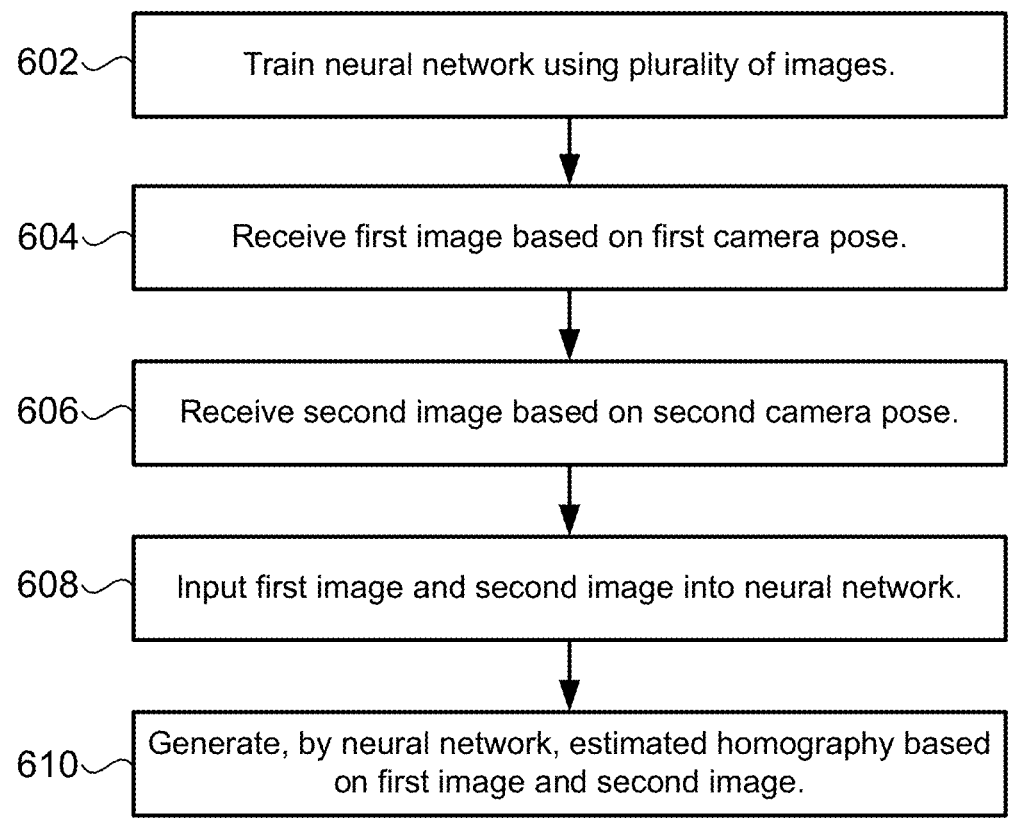
FIG. 6 illustrates a method for generating an estimated homography based on two images, according to an embodiment of the present invention.

FIG. 6 illustrates a method 600 for generating an estimated homography $\hat{H}^{AB}$ based on two images, according to an embodiment of the present invention. Operations of method 600 may be performed in any order, and not all operations need be performed during performance of method 600. At step 602, neural network 201 is trained using a plurality of images by, for example, performing one or more operations as described in relation to the method of training a neural network illustrated in reference to FIG. 4. At step 604, a first image based on a first camera pose is received. The first image may be a 2D image captured by a camera. Receiving the first image may include receiving, retrieving, obtaining, and/or capturing the first image. At step 606, a second image based on a second camera pose is received. The second image may be a 2D image captured by the same camera as the first image or by a different camera. At step 608, the first image and the second image are inputted into neural network 201. At step 610, estimated homography $\hat{H}^{AB}$ may be generated based on the first image and the second image. For example, the first image and the second image may be stacked and fed into neural network 201 which may generate estimated homography $\hat{H}^{AB}$ as an output. In addition to RGB images, embodiments of the present invention are applicable to a wide range of images of varying dimensions and modalities, including, but not-limited to, grayscale images, color images, RGBD images, infrared images, and the like.

It should be appreciated that the specific steps illustrated in FIG. 6 provide a particular method of generating an estimated homography based on two images according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
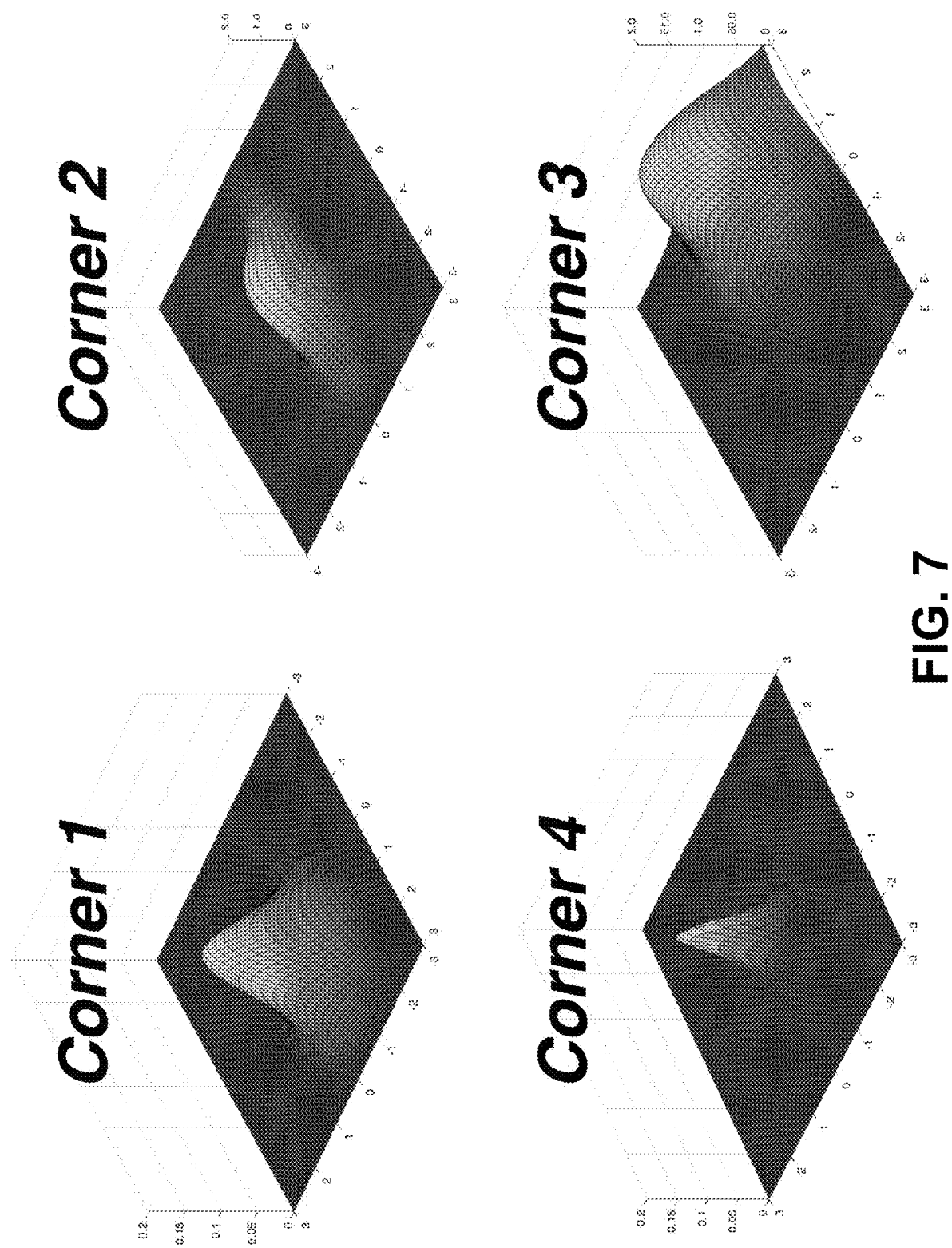
FIG. 7 illustrates four plots corresponding to scores for potential 2D displacements of different corners, according to an embodiment of the present invention.

FIG. 7 illustrates four plots corresponding to scores for potential 2D displacements of different corners, according to an embodiment of the present invention. In some embodiments (generally those utilizing the classification network), neural network 201 generates scores for each potential 2D displacement so that a confidence associated with a particular corner location may be obtained. For example, referring to FIG. 7, because the distribution of scores associated with corner 4 is narrower than the distribution of scores associated with corner 3, the corner location for corner 4 may be estimated with greater confidence than the corner location for corner 3.

Figure 8:
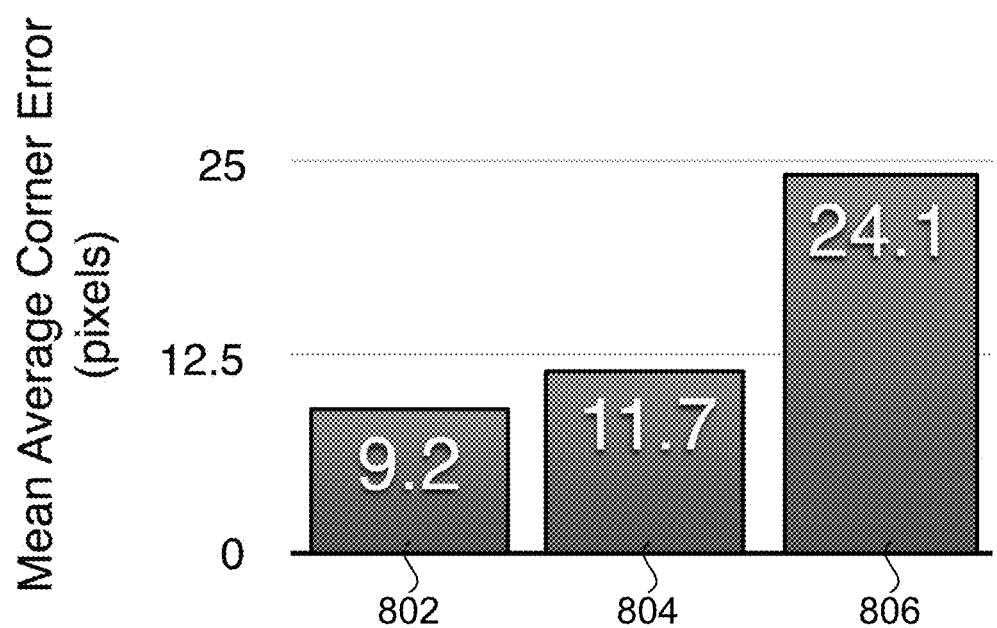
FIG. 8 illustrates a plot showing the mean average corner error of embodiments of the present invention and conventional techniques, according to an embodiment of the present invention.

FIG. 8 illustrates a plot 800 showing the mean average corner error (expressed in pixels) of embodiments of the present invention and conventional techniques. In one implementation of the present disclosure, a Warped MS-COCO 14 Test Set was created by choosing 5,000 images from the test set and resizing each image to grayscale 640×480. Pairs of image patches sized 256×256 were generated with corresponding ground truth homography using method 300 and ρ=64. The classification and regression variants of neural network 201 were compared to a conventional technique. Since some embodiments of the present disclosure expect a fixed sized 128×128×2 input, the image pairs from the Warped MS-COCO 14 Test Set were resized from 256×256×2 to 128×128×2 before being passed through neural network 201. The 4-point parameterized homography output by the network may then be multiplied by a factor of two to account for this. When evaluating the classification network, the corner displacement with the highest confidence is chosen for each of the four returned corners.

The results of this implementation are shown in FIG. 8. The mean average corner error corresponds to the average error between the estimated corner and the actual corner for each of the four corners. In some embodiments, to measure this metric, the L2 distance between the ground truth corner position and the estimated corner position is computed. In FIG. 8, bar 802 corresponds to embodiments of the present disclosure using the regression network, bar 804 corresponds to a conventional approach (ORB+RANSAC), and bar 806 corresponds to embodiments of the present disclosure using the classification network in which scores for potential 2D displacements of different corners (such as those shown in reference to FIG. 7) are generated in addition to estimated homography $\hat{H}^{AB}$. While the regression network performs the best, the classification network can produce confidences and provide a meaningful way to visually debug the results.

FIGS. 9A-9D illustrate homography estimation results using a conventional technique and an embodiment of the present invention. FIGS. 9A and 9B illustrate the output of ORB-based homography estimation and FIGS. 9C and 9D show the output of embodiments of the present invention. Referring to FIG. 9A, a region 910 of image 905 is defined. Referring to FIG. 9B, image 905 has been transformed to form image 915. In FIG. 9B, region 910 has been transformed into region 920 using the same transformation as was used between image 905 and image 915. Thus, a homography $H^{AB}$ is defined between region 910 and region 920. This homography $H^{AB}$ may be referred to as a ground truth homography since it exactly maps region 910 to region 920. In FIG. 9B, an attempt was made to generate an estimated homography using a conventional feature detector such as ORB. However, because the image, which includes a large proportion of uniform sky, lacked a sufficient number of features for the feature detector to function properly, no estimated homography was generated.

In contrast with the conventional method, FIGS. 9C and 9D illustrate the ground truth homography and the estimated homography generated using embodiments of the present invention. Referring to FIG. 9C, which is identical to FIG. 9A, a region 910 of image 905 is defined. In FIG. 9D, region 920 is related to region 910 through homography $H^{AB}$ (i.e., the ground truth homography). Additionally in FIG. 9D, region 940 is related to region 910 by estimated homography $\hat{H}^{AB}$, which was determined using embodiments of the present invention. The differences between subset 920 and subset 940 are negligible in this example, resulting in the regions effectively overlapping. Accordingly, the estimated homography closely matches the ground truth homography, despite the fact that conventional methods failed to generate any estimated homography.

FIGS. 10A-10D illustrate homography estimation results using a conventional technique and an embodiment of the present invention. FIGS. 10A and 10B illustrate the output of ORB-based homography estimation and FIGS. 10C and 10D show the output of embodiments of the present invention. In a manner similar to FIGS. 9A/9B and 9C/9D, a region 1010 of image 1005 is defined. Referring to FIG. 10B, image 1005 has been transformed to form image 1015. In FIG. 10B, region 1010 has been transformed into region 1020 using the same transformation as was used between image 1005 and image 1015. Thus, a (ground truth) homography $H^{AB}$ is defined between region 1010 and region 1020. Region 1010 and region 1030 are related by estimated homography $\hat{H}^{AB}$ determined using ORB-based homography estimation. Referring to FIGS. 10A and 10B, the feature detection process is illustrated by lines 1025 connecting features in region 1010 with features in region 1030. Although enough features were detected using ORB-based homography estimation to generate the estimated homography, the mean corner error for the estimated homography was 91.67.

Referring to FIGS. 10C and 10D, the ground truth homography and the estimated homography generated using embodiments of the present invention are illustrated and compared. Referring to FIG. 10C, which is identical to FIG. 10A, a region 1010 of image 1005 is defined. In FIG. 10D, region 1020 is related to region 1010 through homography $H^{AB}$ (i.e., the ground truth homography). Additionally in FIG. 10D, region 1040 is related to region 1010 by estimated homography $\hat{H}^{AB}$, which was determined using embodiments of the present invention. The differences between subset 1020 and subset 1040 are negligible in this example, resulting in the regions effectively overlapping. This result is in sharp contrast with subset 1030 in FIG. 10B (mean corner error of 91.67) compared to the mean corner error of 4.10 achieved using embodiments of the present invention.

FIGS. 11A-11D illustrate homography estimation results using a conventional technique and an embodiment of the present invention. FIGS. 11A and 11B illustrate the output of ORB-based homography estimation and FIGS. 11C and 11D show the output of embodiments of the present invention. A small amount of Gaussian noise was added to each of the images in FIGS. 11A and 11B to simulate actual images that may be captured by a camera. Referring to FIG. 11A, a region 1110 of image 1105 is defined. Referring to FIG. 11B, image 1105 has been transformed to form image 1115. In FIG. 11B, region 1110 has been transformed into region 1120 using the same transformation as was used between image 1105 and image 1115. Thus, a (ground truth) homography $H^{AB}$ is defined between region 1110 and region 1120. Region 1110 and region 1130 are related by estimated homography $\hat{H}^{AB}$ determined using ORB-based homography estimation. Referring to FIGS. 11A and 11B, the feature detection process is illustrated by lines 1125 connecting features in region 1110 with features in region 1130. Although enough features were detected using ORB-based homography estimation to generate the estimated homography, the mean corner error for the estimated homography was 91.67.

Referring to FIGS. 11C and 11D, the ground truth homography and the estimated homography generated using embodiments of the present invention are illustrated and compared. Referring to FIG. 11C, which is identical to FIG. 11A, a region 1110 of image 1105 is defined. In FIG. 11D, region 1120 is related to region 1110 through homography $H^{AB}$ (i.e., the ground truth homography). Additionally in FIG. 11D, region 1140 is related to region 1110 by estimated homography $\hat{H}^{AB}$, which was determined using embodiments of the present invention. Despite a large number of features distributed over a significant portion of the subset were detected using ORB-based homography estimation, the mean corner error resulting from conventional methods was again significantly greater than that achieved using embodiments of the present invention (51.92 compared to 7.40). Accordingly, embodiments of the present invention are suitable for use, not only in applications in which different camera perspectives result in image transformation, but in applications in which images are blurred and/or blurred/ transformed.

Figure 12:
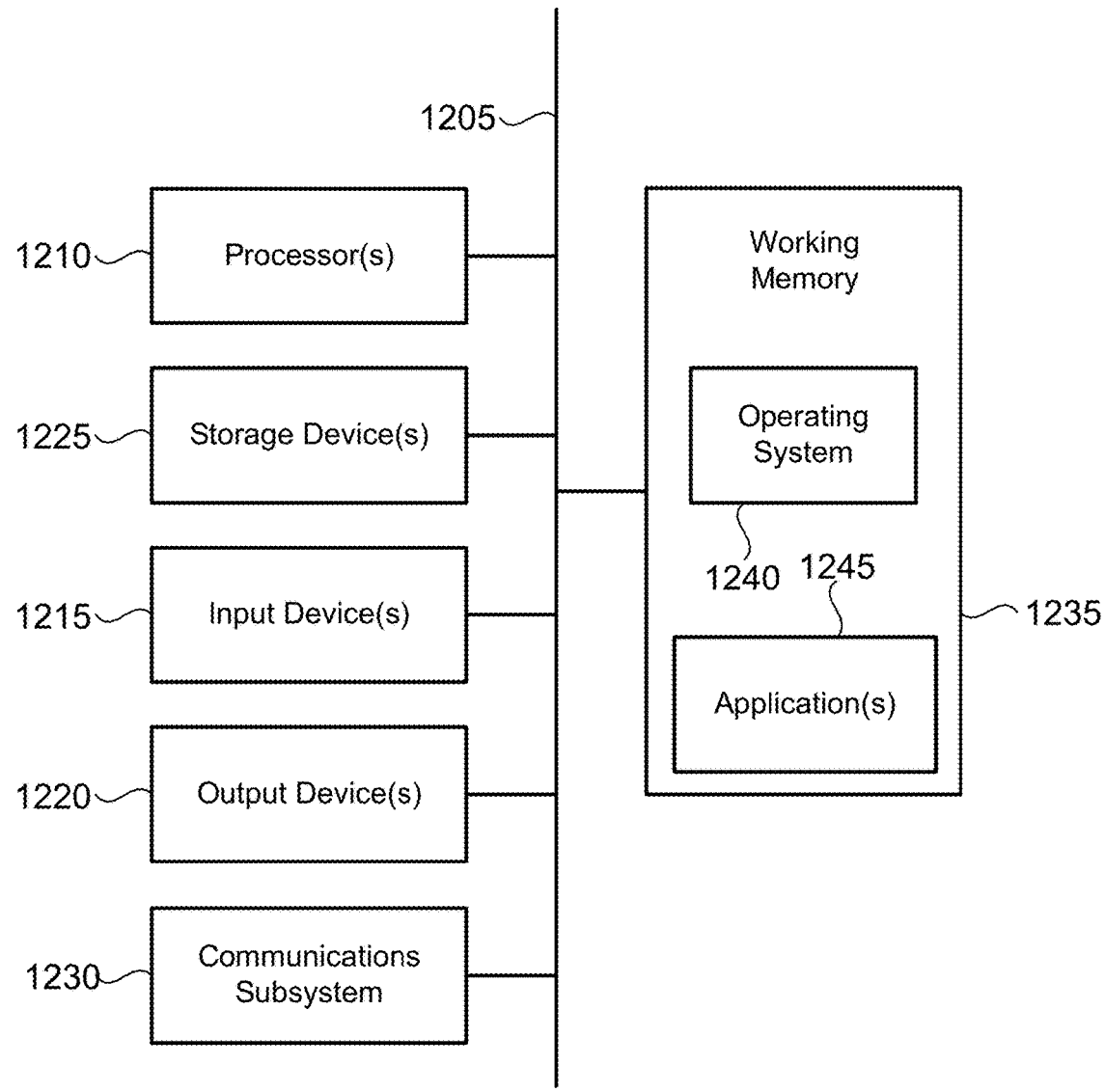
FIG. 12 illustrates a simplified computer system according to an embodiment of the present invention.

FIG. 12 illustrates a simplified computer system 1200, according to an embodiment of the present invention. A computer system 1200 as illustrated in FIG. 12 may be incorporated into devices such as a portable electronic device, mobile phone, or other device as described herein. FIG. 12 provides a schematic illustration of one embodiment of a computer system 1200 that can perform some or all of the steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205, or may otherwise be in communication, as appropriate. The hardware elements may include one or more processors 1210, including without limitation one or more general-purpose processors and/or one or more special-purpose processors such as digital signal processing chips, graphics acceleration processors, and/or the like; one or more input devices 1215, which can include without limitation a mouse, a keyboard, a camera, and/or the like; and one or more output devices 1220, which can include without limitation a display device, a printer, and/or the like.

The computer system 1200 may further include and/or be in communication with one or more non-transitory storage devices 1225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1200 might also include a communications subsystem 1230, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1230 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1230. In other embodiments, a portable electronic device, e.g. the first electronic device, may be incorporated into the computer system 1200, e.g., an electronic device as an input device 1215. In some embodiments, the computer system 1200 will further comprise a working memory 1235, which can include a RAM or ROM device, as described above.

The computer system 1200 also can include software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 12, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1225 described above. In some cases, the storage medium might be incorporated within a computer system, such as computer system 1200. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1200 to perform methods in accordance with various embodiments of the technology. According to a set of embodiments, some or all of the procedures of such methods are performed by the computer system 1200 in response to processor 1210 executing one or more sequences of one or more instructions, which might be incorporated into the operating system 1240 and/or other code, such as an application program 1245, contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1230 and/or components thereof generally will receive signals, and the bus 1205 then might carry the signals and/or the data, instructions, etc. carried by the signals to the working memory 1235, from which the processor(s) 1210 retrieves and executes the instructions. The instructions received by the working memory 1235 may optionally be stored on a non-transitory storage device 1225 either before or after execution by the processor(s) 1210.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for generating inputs for a neural network based on an image, the method comprising:
   receiving the image;
   identifying a position within the image;
   defining a subset of the image at the position, the subset of the image being defined by a first set of corners;
   perturbing at least one of the first set of corners to form a second set of corners, the second set of corners defining a modified subset of the image, wherein perturbing the at least one of the first set of corners to form the second set of corners includes:
      defining a first perturbation region surrounding a first corner of the first set of corners in which a first perturbed corner of the second set of corners may be formed;
      defining a second perturbation region surrounding a second corner of the first set of corners in which a second perturbed corner of the second set of corners may be formed;
      defining a third perturbation region surrounding a third corner of the first set of corners in which a third perturbed corner of the second set of corners may be formed;
      defining a fourth perturbation region surrounding a fourth corner of the first set of corners in which a fourth perturbed corner of the second set of corners may be formed;
      forming the first perturbed corner in a first random position within the first perturbation region;
      forming the second perturbed corner in a second random position within the second perturbation region;
      forming the third perturbed corner in a third random position within the third perturbation region; and
      forming the fourth perturbed corner in a fourth random position within the fourth perturbation region;
   determining a homography based on a comparison between the subset of the image and the modified subset of the image;
   generating a transformed image by applying the homography to the image; and
   defining a subset of the transformed image at the position.

2. The method of claim 1, further comprising:
   sending the subset of the image, the subset of the transformed image, and the homography to the neural network.

3. The method of claim 1, further comprising:
   determining that the subset of the transformed image does not include bordering artifacts.

4. The method of claim 1, wherein identifying the position within the image includes:
   randomly selecting the position within the image such that the first perturbation region, the second perturbation region, the third perturbation region, and the fourth perturbation region do not extend outside the image.

5. The method of claim 1, wherein determining the homography based on the comparison includes:
   determining one or more displacement vectors between the first set of corners and the second set of corners, wherein each of the one or more displacement vectors indicates an offset between corresponding corners in a first dimension and in a second dimension.

6. The method of claim 1, wherein generating the transformed image by applying the homography to the image includes:
   applying an inverse of the homography to the image to generate the transformed image.

7. A method for generating an estimated homography based on two images, the method comprising:
   receiving a first image based on a first camera pose;
   receiving a second image based on a second camera pose;
   inputting the first image and the second image into a neural network; and
   generating, by the neural network, an estimated homography based on the first image and the second image, wherein the neural network was previously trained by:
      receiving a plurality of images; and
      for each individual image of the plurality of images:
         identifying a position within the individual image;
         identifying a subset of the individual image at the position, the subset of the individual image being defined by a first set of corners;
         perturbing at least one of the first set of corners to form a second set of corners, the second set of corners defining a modified subset of the individual image;
         determining a homography based on a comparison between the subset of the individual image and the modified subset of the individual image;
         generating a transformed image by applying the homography to the individual image;
         identifying a subset of the transformed image at the position;
         generating a particular estimated homography based on the subset of the individual image and the subset of the transformed image;
         comparing the particular estimated homography to the homography; and
         modifying the neural network based on the comparison.

8. The method of claim 7, further comprising:
   sending the subset of the individual image, the subset of the transformed image, and the homography to the neural network.

9. The method of claim 7, further comprising:
   determining that the subset of the transformed image does not include bordering artifacts.

10. The method of claim 7, wherein perturbing the at least one of the first set of corners to form the second set of corners includes:
- defining a first perturbation region surrounding a first corner of the first set of corners in which a first perturbed corner of the second set of corners may be formed;
- defining a second perturbation region surrounding a second corner of the first set of corners in which a second perturbed corner of the second set of corners may be formed;
- defining a third perturbation region surrounding a third corner of the first set of corners in which a third perturbed corner of the second set of corners may be formed;
- defining a fourth perturbation region surrounding a fourth corner of the first set of corners in which a fourth perturbed corner of the second set of corners may be formed;
- forming the first perturbed corner in a first random position within the first perturbation region;
- forming the second perturbed corner in a second random position within the second perturbation region;
- forming the third perturbed corner in a third random position within the third perturbation region; and
- forming the fourth perturbed corner in a fourth random position within the fourth perturbation region.

11. The method of claim 10, wherein identifying the position within the individual image includes:
- randomly selecting the position within the individual image such that the first perturbation region, the second perturbation region, the third perturbation region, and the fourth perturbation region do not extend outside the individual image.

12. The method of claim 7, wherein generating the transformed image by applying the homography to the individual image includes:
- applying an inverse of the homography to the individual image to generate the transformed image.

13. A method for generating inputs for a neural network based on an image, the method comprising:
- receiving the image;
- identifying a position within the image;
- defining a first sub-image of the image at the position, the first sub-image being defined by a first set of corners;
- perturbing at least one of the first set of corners to form a second set of corners, the second set of corners defining a modified sub-image, wherein perturbing the at least one of the first set of corners to form the second set of corners includes:
  - defining a first perturbation region surrounding a first corner of the first set of corners in which a first perturbed corner of the second set of corners may be formed;
  - defining a second perturbation region surrounding a second corner of the first set of corners in which a second perturbed corner of the second set of corners may be formed;
  - defining a third perturbation region surrounding a third corner of the first set of corners in which a third perturbed corner of the second set of corners may be formed;
  - defining a fourth perturbation region surrounding a fourth corner of the first set of corners in which a fourth perturbed corner of the second set of corners may be formed;
  - forming the first perturbed corner in a first random position within the first perturbation region;
  - forming the second perturbed corner in a second random position within the second perturbation region;
  - forming the third perturbed corner in a third random position within the third perturbation region; and
  - forming the fourth perturbed corner in a fourth random position within the fourth perturbation region;
- determining a homography based on a comparison between the first sub-image and the modified sub-image;
- generating a transformed image by applying the homography to the image;
- defining a second sub-image of the transformed image at the position; and
- sending the first sub-image, the second sub-image, and the homography to the neural network.

14. The method of claim 13, further comprising determining that the second sub-image does not include bordering artifacts.

15. The method of claim 13, wherein identifying the position within the image includes randomly selecting the position within the image such that the first perturbation region, the second perturbation region, the third perturbation region, and the fourth perturbation region do not extend outside the image.

16. The method of claim 13, wherein determining the homography based on the comparison includes determining one or more displacement vectors between the first set of corners and the second set of corners, wherein each of the one or more displacement vectors indicates an offset between corresponding corners in a first dimension and in a second dimension.

17. The method of claim 13, wherein generating the transformed image by applying the homography to the image includes applying an inverse of the homography to the image to generate the transformed image.

* * * * *